US009772697B2

(12) United States Patent
Gur et al.

(10) Patent No.: US 9,772,697 B2
(45) Date of Patent: Sep. 26, 2017

(54) TOUCH DOWN DETECTION WITH A STYLUS

(71) Applicant: Microsoft Technology Licensing, LLC, Redmond, WA (US)

(72) Inventors: Arie Gur, Kiryat-Ono (IL); Amir Zyskind, Natania (IL); Ilan Geller, Pardesia (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

(21) Appl. No.: 14/986,766

(22) Filed: Jan. 4, 2016

(65) Prior Publication Data

US 2016/0195944 A1 Jul. 7, 2016

Related U.S. Application Data

(60) Provisional application No. 62/099,526, filed on Jan. 4, 2015.

(51) Int. Cl.
*G06F 3/037* (2013.01)
*G06F 3/0354* (2013.01)
(Continued)

(52) U.S. Cl.
CPC ........ *G06F 3/03545* (2013.01); *G06F 3/0383* (2013.01); *G06F 3/044* (2013.01);
(Continued)

(58) Field of Classification Search
USPC ................ 345/156, 173, 174, 179
See application file for complete search history.

(56) References Cited

U.S. PATENT DOCUMENTS

| 5,571,997 A | 11/1996 | Gray et al. |
| 7,292,229 B2 | 11/2007 | Morag et al. |

(Continued)

FOREIGN PATENT DOCUMENTS

| EP | 1303061 | 4/2003 |
| WO | WO 2015/036999 | 3/2015 |
| WO | WO 2016/108214 | 7/2016 |

OTHER PUBLICATIONS

International Search Report and the Written Opinion Dated Jun. 29, 2016 From the International Searching Authority Re. Application No. PCT/IB2016/050013. (17 Pages).

(Continued)

*Primary Examiner* — Thuy Pardo

(57) ABSTRACT

A device includes a tip, a sensor, memory and a circuit. The tip is sensitive to contact pressure. The sensor detects the contact pressure. Memory stores at least one pre-defined first threshold and a pre-defined second threshold on the contact pressure. The first threshold defines tip state as one of a pen-up and a pen-down. Pressures below the first threshold defines pen-up and pressures above the first threshold define pen-down. The second threshold is below the first threshold. The circuit transmits in a hover transmission mode based on detecting pressures below the second threshold, switches to an writing transmission mode based on detecting a pressure at or above the second threshold and terminates the writing transmission mode based on detecting the pen-up status for a first pre-defined period. The writing transmission mode frame rate is higher than a hover transmission mode frame rate.

20 Claims, 4 Drawing Sheets

(51) Int. Cl.
*G06F 3/041* (2006.01)
*G06F 3/044* (2006.01)
*G06F 3/046* (2006.01)
*G06F 3/038* (2013.01)

(52) U.S. Cl.
CPC ............ *G06F 3/046* (2013.01); *G06F 3/0414* (2013.01); *G06F 3/0418* (2013.01)

(56) References Cited

U.S. PATENT DOCUMENTS

| | | | |
|---|---|---|---|
| 7,646,379 B1 | 1/2010 | Drennan et al. | |
| 8,022,317 B2 | 9/2011 | Ely | |
| 8,411,053 B2 | 4/2013 | Doubrava et al. | |
| 8,629,358 B2 | 1/2014 | Rimon et al. | |
| 8,669,967 B2 | 3/2014 | Zachut | |
| 8,730,177 B2 | 5/2014 | Westerman et al. | |
| 9,035,920 B2 | 5/2015 | Stern | |
| 9,081,448 B2 | 7/2015 | Geaghan | |
| 9,182,835 B2 | 11/2015 | King-Smith et al. | |
| 9,244,543 B1* | 1/2016 | Sundara-Rajan | G06F 3/03545 |
| 9,542,014 B1* | 1/2017 | Sundara-Rajan | G06F 3/03545 |
| 2003/0214490 A1 | 11/2003 | Cool | |
| 2004/0150631 A1* | 8/2004 | Fleck | G06F 3/038 345/179 |
| 2004/0160429 A1* | 8/2004 | Blake | G06F 3/043 345/179 |
| 2009/0153526 A1* | 6/2009 | Blake | G06F 3/043 345/179 |
| 2010/0051356 A1 | 3/2010 | Stern et al. | |
| 2010/0155153 A1 | 6/2010 | Zachut | |
| 2011/0176467 A1 | 7/2011 | Lampe et al. | |
| 2012/0127110 A1 | 5/2012 | Amm et al. | |
| 2013/0088465 A1 | 4/2013 | Geller et al. | |
| 2013/0106714 A1 | 5/2013 | Shahparnia et al. | |
| 2013/0106722 A1 | 5/2013 | Shahparnia et al. | |
| 2013/0265265 A1 | 10/2013 | Stern | |
| 2013/0328810 A1* | 12/2013 | Li | G06F 3/043 345/173 |
| 2014/0104188 A1* | 4/2014 | Bakken | G06F 3/044 345/173 |
| 2014/0111461 A1* | 4/2014 | Rimon | G06F 3/03545 345/173 |
| 2014/0168116 A1 | 6/2014 | Sasselli et al. | |
| 2014/0168142 A1* | 6/2014 | Sasselli | G06F 3/0416 345/174 |
| 2014/0176495 A1* | 6/2014 | Vlasov | G06F 3/044 345/174 |
| 2014/0184567 A1 | 7/2014 | Zachut | |
| 2014/0210785 A1* | 7/2014 | King-Smith | G06F 3/03545 345/174 |
| 2014/0253467 A1 | 9/2014 | Hicks et al. | |
| 2014/0267078 A1* | 9/2014 | Kukulski | G06F 3/0416 345/173 |
| 2014/0368455 A1 | 12/2014 | Croisonnier et al. | |
| 2015/0145820 A1* | 5/2015 | Huang | G06F 3/044 345/174 |
| 2015/0170383 A1* | 6/2015 | Motoi | G06T 11/203 345/173 |
| 2015/0212597 A1 | 7/2015 | Westhues | |
| 2015/0346847 A1* | 12/2015 | Zachut | G06F 3/03545 345/174 |
| 2015/0346890 A1* | 12/2015 | Zachut | G06F 3/03545 345/174 |
| 2015/0363012 A1* | 12/2015 | Sundara-Rajan | G06F 3/038 345/179 |
| 2016/0162051 A1* | 6/2016 | Peretz | G06F 3/041 345/179 |
| 2016/0179222 A1* | 6/2016 | Chang | G06F 3/03545 345/179 |
| 2016/0195943 A1 | 7/2016 | Gur et al. | |

OTHER PUBLICATIONS

Written Opinion Dated Nov. 8, 2016 From the International Preliminary Examining Authority Re. Application No. PCT/IB2016/050013. (8 Pages).
International Preliminary Report on Patentability Dated Mar. 20, 2017 From the International Preliminary Examining Authority Re. Application No. PCT/IB2016/050013. (18 Pages).
International Search Report and the Written Opinion Dated Nov. 18, 2016 From the International Searching Authority Re. Application No. PCT/IB2016/050014. (18 Pages).
Official Action Dated Dec. 2, 2016 From the US Patent and Trademark Office Re. U.S. Appl. No. 14/986,764. (16 pages).
Communication Relating to the Results of the Partial International Search Dated Mar. 30, 2016 From the International Searching Authority Re. Application No. PCT/IB2016/050013.
Atmel "Atmel Launches Next Generation MaXStylus mXTS220 Active Pen Active Pen Platform Delivering Extremely Precise Handwriting With An Archtitecture Built for the Future of Stylus. MaZStylus mXTS220 Delivers Significantly Improved Active Pen Performance With Longer Battery Life, Higher Noise Immunity and Optimized Design for Lower System Cost for Mobile Devices", Atmel Corporation, 2 P., Jan. 7, 2015.
Linenberger "The Importance of an Active Digitizer Pen", Blog, p. 1-42, Oct. 16, 2013.

* cited by examiner

TOUCH DOWN DETECTION WITH A STYLUS

RELATED APPLICATION

This application claims the benefit of priority under 35 USC §119(e) of U.S. Provisional Patent Application No. 62/099,526 filed on Jan. 4, 2015, the contents of which are incorporated herein by reference in their entirety.

BACKGROUND

Signal emitting styluses, e.g. active styluses are known in the art for use with a digitizer system. Position of the stylus provides input to a computing device associated with the digitizer system and is interpreted as user commands Often, the digitizer system is integrated with a display screen, e.g. to form a touch-screen. Position of the stylus over the touch-screen is correlated with virtual information portrayed on the screen. The signal emitted by the stylus may include information such as pressure applied on the writing tip and stylus identification. The signal is decoded by the digitizer system to obtain the information.

Digitizer systems typically include a matrix of electrode junctions arranged in rows and columns Stylus location may be tracked by sampling output in both row and column direction. Tracking is based on detecting a signal emitted by a tip of the stylus and picked up by the digitizer sensor due to electrostatic coupling established between the tip and a portion of the matrix. Digitizer systems that track signals emitted by the stylus also typically track input provided with a finger or conductive object. A mutual capacitive sensor is one type of digitizer sensor for such digitizer systems. Mutual capacitive detection allows multi-touch operation where multiple fingers, palms or conductive objects are tracked at the same time.

SUMMARY

The disclosure in some embodiments relates to stylus and to a digitizer system with improved response time at an initial touchdown of the stylus and improved performance during inking with the stylus. According to some exemplary embodiments, when a stylus first touches (pen-down) the touch screen after an extended lapse in pen-down events, the stylus may initiate a synchronization transmission mode to help the touch-screen locking into the stylus signal quickly.

According to some exemplary embodiments, once the touch enabled device succeeds in locking into the stylus signal, the stylus initiates a writing transmission mode. During the writing transmission mode, the stylus may transmit enhanced data related to tip pressure on the stylus based on which the touch-screen can define inking. The stylus may typically maintain the writing transmission mode as long as periodic pen-down events are detected and may terminate the writing transmission mode after a pre-defined lapse in pen-down events. The writing transmission mode may also be initiated while the stylus is in synchronization with the touch screen but after a period stylus hovering. Optionally, the writing transmission mode in this case may be initiated just before a pen-down event actually occurs. Optionally, the enhanced data transmitted during this mode may enable the touch-screen to detect timing of the pen-down event more accurately. During a hover transmission mode, less information may be transmitted by the stylus to help preserve battery life of the stylus.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
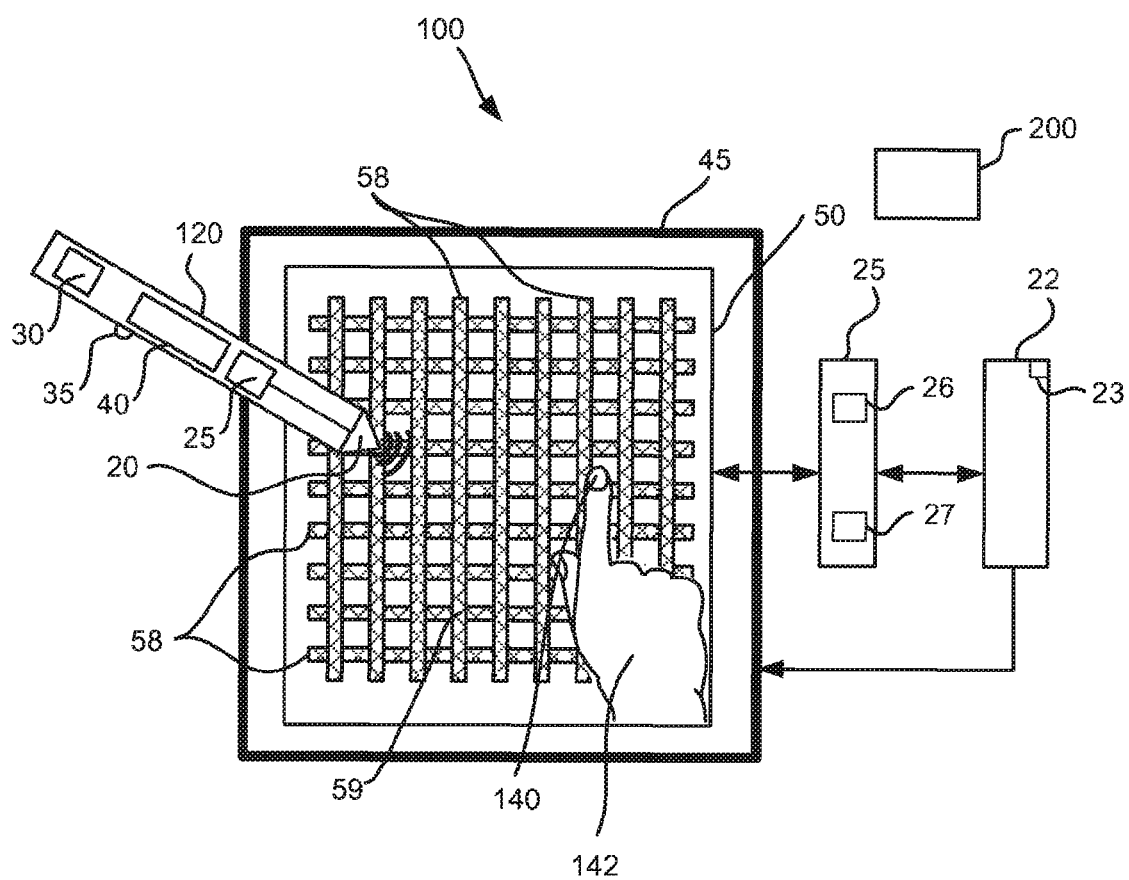
FIG. 1 is a simplified block diagram of an exemplary touch enabled computing device in accordance with some embodiments of the present disclosure.

According to some exemplary embodiments, when the stylus first touches down (pen-down) on the touch enabled computing device after an extended lapse in pen-down events, the stylus enters a synchronization transmission mode to help the touch enabled device to lock into the stylus transmission cycle. During the synchronization transmission mode, the stylus increases a number of beacon signals transmitted per frame. Typically, the train of beacon signals transmitted includes an actual beacon signal and a plurality of dummy beacon signals. Synchronization may be established when the touch-screen locks into the actual beacon signal. Optionally, the dummy beacon signals include information regarding timing of the actual beacon signal so that the touch enabled computing device can synchronize with the actual beacon signal based on detection of the dummy beacon. In some exemplary embodiments, the touch screen may infer timing of the actual beacon signal based on detection of a dummy beacon signal. Optionally, the dummy beacon signals appear after an actual beacon is numbered in chronological order. The touch-screen transmission of the multiple beacon signals per frame may be continued for a pre-defined period or until the touch enabled device succeeds in locking into the stylus signal.

The accelerated transmission of beacon signals may optionally be initiated responsive to the stylus detecting that a user is holding the stylus after a pre-defined period that the stylus was not held. In some exemplary embodiments, the accelerated transmission of the beacon signals is initiated in response to the stylus detecting pressure applied on its tip. Optionally, the accelerated transmission of the beacon signals is based on the stylus detecting a signal transmitted by the touch enabled computing device, e.g. via a touch screen of the device.

The accelerated transmission of the beacon signals may continue for a pre-defined number of frames, e.g. 2-10 frames. Optionally, the accelerated transmission of the beacon signals is continued for a relatively longer period, e.g. 5-50 frames when it is initiated based on sensing that the user is holding the stylus.

In some exemplary embodiments, after a synchronization transmission mode, a stylus may initiate a writing transmission mode. During the writing transmission mode, the stylus may transmit a beacon signal and pen tip state, e.g. pen-down or pen-up once per frame. Although, position of the stylus may be tracked during both pen-up and pen-down, inking is typically initiated responsive to receiving a pen-down report. Pen-down is typically reported by the stylus when the stylus detects a pressure on the tip above a defined tip threshold. The pen may report once every repetition cycle of the stylus. At times there may be a delay between timing at which the pen-down occurred and a first report of the pen-down. This delay, although short may introduce a noticeable lag inking. Likewise a delay between timing at which the pen-up occurred and a first report of the pen-up may cause inking to continue after a user raised the stylus above the touch-screen.

In some exemplary embodiments, a stylus may transmit a time stamp together with reporting of the tip status. The time stamp indicates when a switch between pen-up and pen-down occurred. In some exemplary embodiments, the frame rate of the stylus is accelerated during the writing transmission mode. Optionally, a frame may be transmitted ever 3-5 msec, e.g. 3.75 msec as opposed to ever 5-20 msec, e.g. 15 msec. Increasing the frame rate may help reduce lag in inking and a termination of inking. Optionally, the stylus may transmit the pressure detected by the stylus as well as the pen-tip state during the writing transmission mode. Optionally, the touch enabled device processes the pressures and determines when to display ink (pen-down) and when not to display ink (pen-up) based on both the processing of the pressures reported and the reported stylus tip state. Typically, the touch controller has stronger processing abilities as compared to a circuit in the stylus and can perform more advanced processing to improve performance of the inking. According to some exemplary embodiments, the writing transmission mode is maintained during inking and for a pre-defined period that a pen-down state is sustained, e.g. 200 msec. Optionally, after the pre-defined period, the stylus initiates a hover transmission mode. Typically, the frame rate and the data transmitted per frame is reduced when switching to the hover transmission mode. Reducing the frame rate and the amount of data transmitted may help preserve battery life.

According to some exemplary embodiments, a stylus may initiate writing transmission mode while in a hover transmission mode. Optionally, a threshold close to a pen-down threshold may be defined for initiating the writing transmission mode during hover. Once this threshold pressure is reached, the stylus may begin transmitting both tip state and tip pressure. Typically, timing of the pen-down event when it occurs can be detected with higher resolution while operating in the writing transmission mode.

Reference is now made to FIG. 1 showing a simplified block diagram of an exemplary touch enabled computing device in accordance with some embodiments of the present disclosure. According to some embodiments of the present disclosure, a computing device 100 includes a display 45 that is integrated with a digitizer sensor 50. In some exemplary embodiments, digitizer sensor 50 is a grid based capacitive sensor formed with row and column conductive strips 58 forming grid lines of the grid based sensor. Typically, conductive strips 58 are electrically insulated from one another and each of conductive strips is connected at least at on one end to circuit 25, e.g. touch controller. Typically, conductive strips 58 are arranged to enhance capacitive coupling between row and column conductive strips, e.g. around junctions 59 formed between rows and columns. The capacitive coupling formed between the row and column conductive strips is sensitive to presence of conductive and dielectric objects. Alternatively, digitizer sensor formed with a matrix of electrode junctions that is not necessarily constructed based on row and column conductive strips.

According to some embodiments of the present disclosure, conductive strips 58 are operative to detect touch of one or more fingertips 140 or hand 142 or other conductive objects as well as input by stylus 120 transmitting an electromagnetic signal typically via the writing tip of stylus 120. Typically, output from both row and column conductive strips 58, e.g. from two perpendicular axes are sampled to detect coordinates of stylus 120. In some exemplary embodiments, circuit 25 typically includes a stylus detection engine 27 for synchronizing with stylus 120, for processing input received by stylus 120, for tracking coordinates of stylus 120 and/or for tracking pen-up and pen-down events.

Input received by stylus 120 may include information directly related to stylus 120, related to an environment around the stylus 120, to a user using stylus 120, to privileges allotted to the stylus 120, capabilities of stylus 120, or information received from a third party device. Information related to the stylus may include indications of a pressed button(s) 35, pressure level on tip 20, tilt, identification, manufacturer, version, media access control (MAC) address, and stored configurations such as color, tip type, brush, and add-ons. Typically, stylus 120 include a pressure sensor 15 associated with tip 20 for sensing pressure applied on tip 20.

In exemplary embodiments of the present disclosure, stylus 120 periodically transmits indication of one of a pen-up or a pen-down state of its tip. Indication is based on output from pressure sensor 15. Typically, a first threshold is defined to differentiate between pen-up and pen-down. Pressure readings below the first threshold are reported as pen-up and pressure readings above the first threshold are reported as pen down. Optionally, due to hysteresis the first threshold may include a pair of thresholds, one threshold for switching from pen-up to pen-down and another threshold for switching between pen-down to pen-up. In some exemplary embodiments, a second threshold on pressure measurements defines when a writing transmission mode is to begin. Typically, the second threshold is defined to be lower than the first threshold so that the accelerated transmission may begin before the first stroke is initiated. According to some exemplary embodiments, during the writing transmission mode, pressure output from the pressure sensor is also transmitted by the stylus.

Typically, stylus 120 includes an ASIC 40 that controls generation of a signal emitted by stylus 120. ASIC 40 typically encodes information generated, stored or sensed by stylus 120 on the signal transmitted by stylus 120. Typically, stylus detection engine 27 decodes information received from stylus 120. Optionally, other handheld devices configured to interact with digitizer sensor 50 may be operated in a similar manner and tracked by stylus detection engine 27.

Circuit 25, e.g. touch controller may apply mutual capacitance detection or a self-capacitance for sensing a touch signal from touch (or hover) of fingertip 140. Typically, during mutual capacitance and self-capacitance detection, circuit 25 sends a triggering signal, e.g. pulse to one or more conductive strips 58 of digitizer sensor 50 and samples output from conductive strips 58 in response to the triggering and/or interrogation. In some embodiments, some or all of conductive strips 58 along one axis of the grid are triggered simultaneously or in a consecutive manner, and in response to each triggering, outputs from conductive strips 58 on the other axis are sampled. Typically, this procedure provides for detecting coordinates of multiple fingertips 140 touching sensor 50 at the same time (multi-touch). Circuit 25 typically includes finger detection engine 26 for managing the triggering signal, for processing the touch signal and for tracking coordinates of one or more fingertips 140.

Typically, output from circuit 25 is reported to host 22. Typically, the output provided by circuit 25 may include coordinates of one or more fingertips 140, coordinates of writing tip 20 of stylus 120, a pen-up or pen-down status of tip 20, pressure applied on tip 20 and additional information provided by stylus 120, e.g. pressure, tilt, and battery level. Typically, circuit 25 uses both analog and digital processing to process signals detected with digitizer sensor 50. Optionally, some and/or all of the functionalities of engines 26 and 27 are integrated in one or more processing units adapted for controlling operation of digitizer sensor 50. Optionally, some and/or all of the functionalities of circuit 25, engines 26 and 27 are integrated and/or included in host 22. Host 22 may transmit the information to an application manager or a relevant application. Optionally, circuit 25 and host 22 may transfer the raw information to an application. The raw information may be analyzed or used as needed by the application. At least one of stylus 120, circuit 25 and host 22 may pass on the raw information without analysis or being aware of the information.

According to some exemplary embodiments, stylus 120 additionally includes a wireless communication unit 30, e.g. an auxiliary channel with Bluetooth communication, near field communication (NFC), radio frequency (RF) communication using module 23 of host 22. In some exemplary embodiments, host 22 or circuit 25 instructs stylus 120 to update or configure its transmission protocol based on analysis and reports from circuit 25 and host 22.

Figure 2:
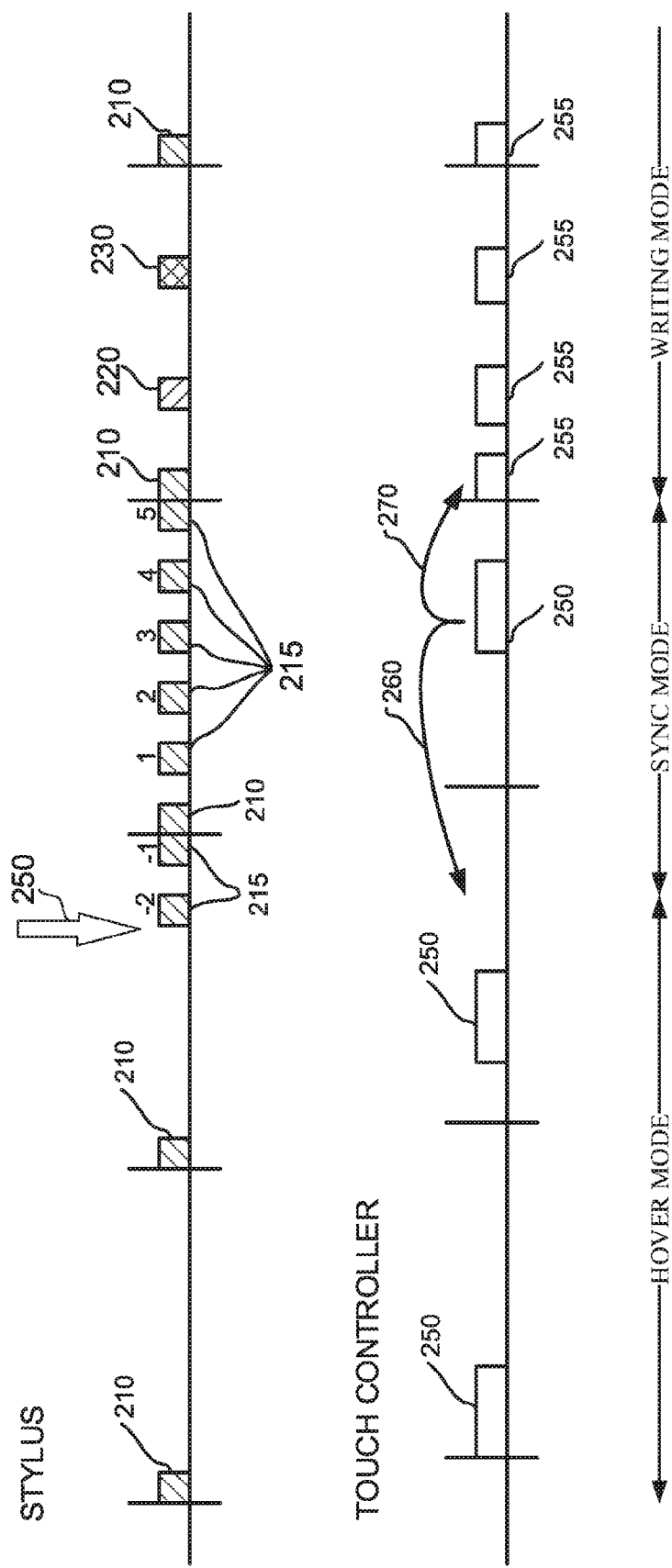
FIG. 2 is a simplified time line of exemplary stylus transmission and touch controller sampling periods during a synchronization transmission mode in accordance with some embodiments of the present disclosure.

FIG. 2 is a simplified time line of exemplary stylus transmission and touch controller sampling periods during a synchronization transmission mode in accordance with some embodiments of the present disclosure. Prior to detecting presence of a stylus, a touch controller may operate in a hover transmission mode. During the hover transmission mode, the stylus may transmit a beacon signal 210 once per frame. Optionally, additional data is transmitted during the hover transmission mode, e.g. identification data. A hover transmission mode is typically initiated at start up of the system, after a stylus signal is lost and after an extended period with no pen-down events by a stylus. During this hover transmission mode, the touch controller searches for the stylus signal over chunk sampling windows 250 that may be scattered over a refresh cycle of the touch controller. The refresh cycle of the touch controller and the frame of the stylus are typically not synchronized at this stage.

According to some exemplary embodiments, when a stylus detects a pen-down event 250 it switches from transmitting in a hover transmission mode to transmitting in a synchronization transmission mode for synchronizing the touch controller with the stylus frame transmission. Optionally, during synchronization, the touch controller locks its refresh cycle to match an onset of a frame of data transmitted by the stylus. In some exemplary embodiments, the stylus transmits a beacon signal and one or more dummy beacon signals 215 per frame. Optionally, a dummy beacon signal is transmitted once every 3.75 msec while a frame may last 10-20 msec. Transmission of dummy beacon signals may optionally begin as soon as pen-down is detected even if it is in the middle of a frame of stylus transmission. In some exemplary embodiments, dummy beacon signals 215 are encoded to indicate distance (in time) to the actual beacon with which the touch controller needs to synchronize with. Optionally, dummy beacon signals 215 are numbered based on which distance 270 to an actual beacon 210 can be determined. In some exemplary embodiments, dummy beacon signals 215 as well as the actual beacon signal 210 are encoded with a time stamp (or are accompanied with a time stamp) to indicate distance 260 between the dummy beacon and the timing of pen-down. Typically, the synchronization transmission mode lasts for a pre-defined period or until synchronization is confirmed. Optionally, the stylus receives feedback from the touch controller regarding synchronization between the stylus and the touch enabled device using an auxiliary communication channel, e.g. Bluetooth or NFC. Alternatively, the touch controller provides confirmation via the digitizer sensor. According to some exemplary embodiments, a writing transmission mode is initiated at the termination of the synchronization transmission mode. During a writing transmission mode, beacon 210, tip state 220 and optionally pressure 230 are transmitted once per frame.

Figure 3:
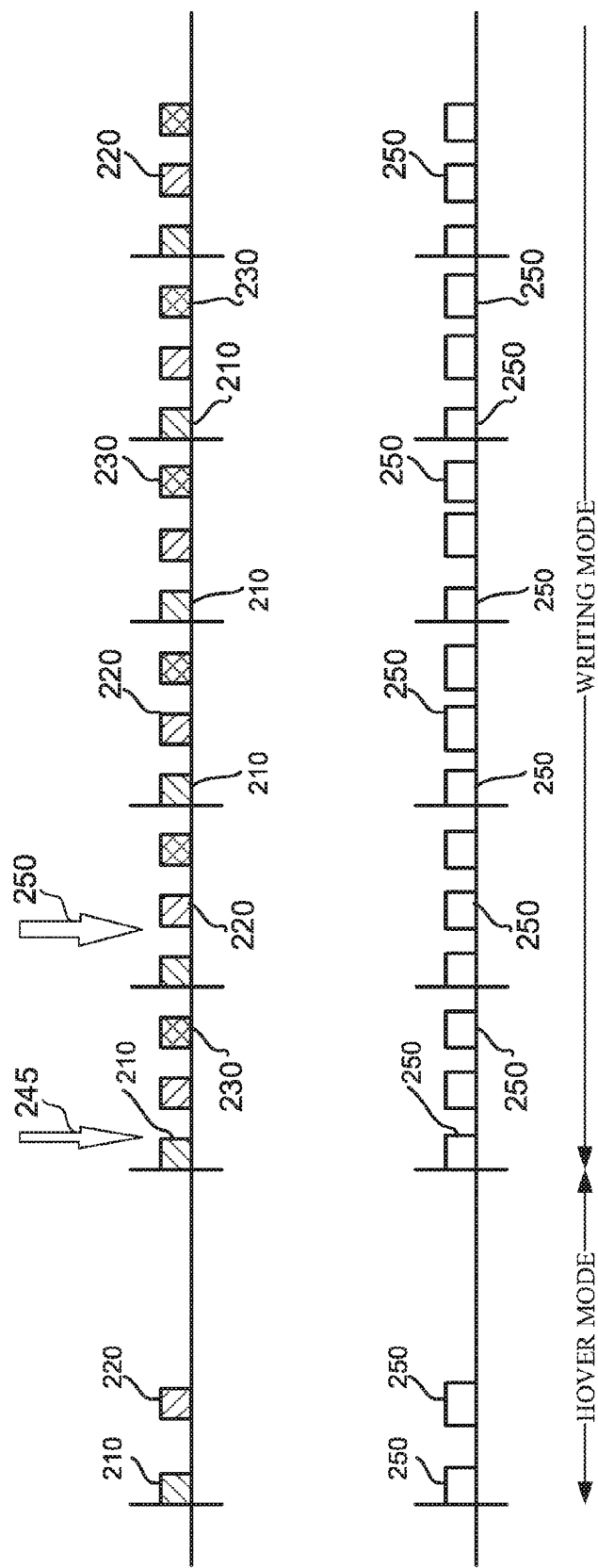
FIG. 3 is a simplified time line of exemplary stylus transmission and touch controller sampling periods during a writing transmission mode in accordance with some embodiments of the present disclosure.

FIG. 3 is a simplified time line of exemplary stylus transmission and touch controller sampling periods during a writing transmission mode in accordance with some embodiments of the present disclosure. A touch controller may maintain synchronization with a stylus while it is hovering over the touch enabled computing device. In some exemplary embodiments, a writing transmission mode is initiated when the stylus reaches a near pen-down state. Optionally, the stylus transmits an indication to the touch-screen prior to switching to the writing transmission mode so that the touch-screen will synchronize itself to transmission times of the writing transmission mode. A near pen-down event 245 may be a defined by a pressure below the tip pressure threshold. Typically, a threshold for detecting a near pen down even 245 is pre-defined.

In some exemplary embodiments, during the writing transmission mode, the frame rate of the stylus is increased from once per 15 msec to once per 3.75 msec. Typically, a beacon signal 210, tip state signal 220 and pressure information 230 is transmitted during each stylus frame. According to some exemplary embodiments, sampling periods of the touch controller are synchronized with known times of transmission of data. This increase in transmission rate, reduces a potential lag between when a pen-down actually occurs and when it is detected. Optionally, the stylus transmits is timestamp to indicate when a switch between pen-up and pen-down occurred or when a switch between pen-down and pen-up occurred. A touch controller can detect timing of a pen-down event based both on tip state signal 220 and pressure information. Optionally, the touch controller may apply additional processing besides threshold to define pen-down and pen-up for inking purposes. Optionally, a rate of in a change of pressure or a pattern in the pressure profiles may be used to determine when to initiate or terminate inking.

Figure 4:
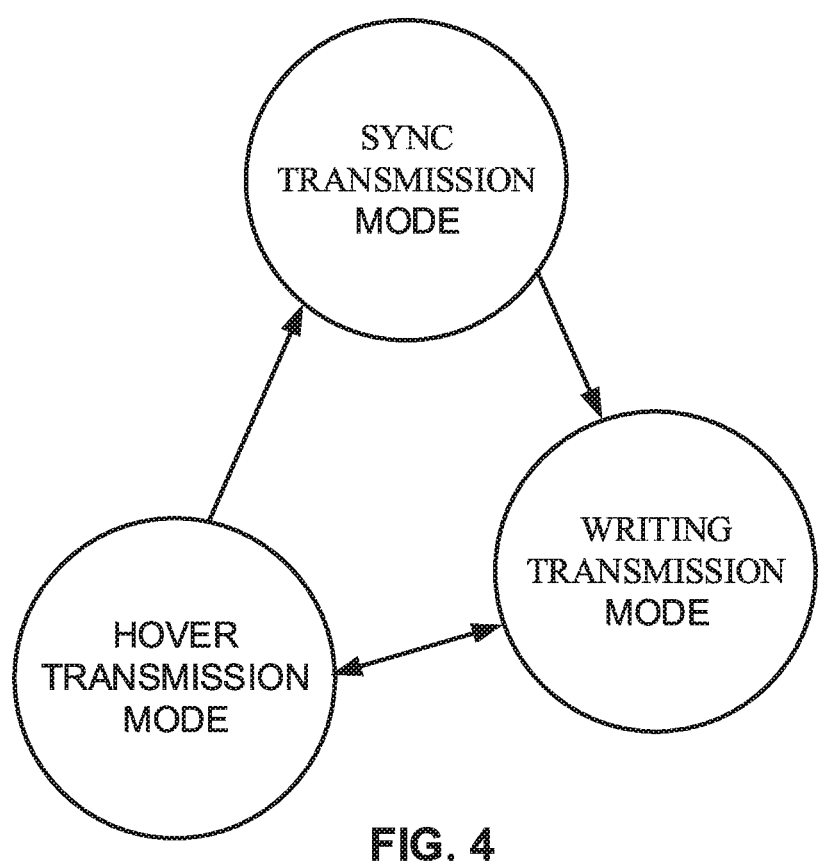
FIG. 4 is simplified diagram showing exemplary transition between different modes in accordance with some embodiments of the present disclosure.

FIG. 4 is simplified diagram showing exemplary transition between different modes in accordance with some embodiments of the present disclosure. According to some exemplary embodiments, a stylus starts transmission in a hover transmission mode and can either switch to a synchronization transmission mode or to an writing transmission mode based on the a time period since a last pen-down event occurred. Typically for relatively short lapses, hover switches to writing transmission mode and after long lapses it switches to synchronization. Typically, a synchronization transmission mode is followed by a writing transmission mode. The writing transmission mode typically continues until a pre-defined time period lapsed since the last pen-down. Optionally, the pre-defined time period for short lapses, e.g. switching between hover and writing transmission modes is in the order of magnitude to 10 msec and the pre-defined period for long lapses, e.g. switching to synchronization transmission mode is in the order of magnitude of seconds.

According to some exemplary embodiments, there is provided a device comprising: a tip that is sensitive to contact pressure; a sensor configured to detect the contact pressure; memory configured to store at least one pre-defined first threshold and a pre-defined second threshold on the contact pressure, wherein the first threshold defines tip state as one of a pen-up and a pen-down, wherein pressures below the first threshold defines pen-up and pressures above the first threshold define pen-down and the second threshold is below the first threshold; a circuit configured to: transmit in a hover transmission mode based on detecting pressures below the second threshold; switch to an writing transmission mode based on detecting a pressure at or above the second threshold, wherein the writing transmission mode frame rate is higher than a hover transmission mode frame rate; and terminate the writing transmission mode based on detecting the pen-up status for a first pre-defined period.

Optionally, the circuit is configured to transmit the tip state and the pressure during the writing transmission mode.

Optionally, the circuit is configured to transmit a time stamp indicating a switch between the pen-up and the pen-down.

Optionally, the circuit is configured to transmit the pressure during the writing transmission mode and not to transmit pressure during the hover transmission mode.

Optionally, the circuit is configured to switch to a synchronization transmission mode based on detecting the pen-up status for a second pre-defined period, the second pre-defined period being longer than the first pre-defined period, wherein the circuit is defined to transmit beacon signals at an accelerated rate during the synchronization transmission mode as compared to rate of transmitting beacon signals in the hover transmission mode.

Optionally, the beacon signals transmitted during the synchronization transmission mode includes dummy beacon signals.

Optionally, the beacon signals are encoded with information regarding timing of an actual beacon signal.

Optionally, the at least one pre-defined first threshold includes one threshold to define a switch between pen-up and pen-down and another threshold to define a switch between pen-down and pen-up.

Optionally, the first pre-defined period is in the order of magnitude of 10 msec.

According to some exemplary embodiments there is provided a method comprising: detecting pressure applied on a tip of a stylus; defining at least one first threshold configured to define tip state as one of a pen-up and pen-down, wherein pressures below the first threshold defines pen-up and pressures above the first threshold define pen-down; defining a second threshold below the first threshold; transmitting in a hover transmission mode based on detecting pressures below the second threshold; switching to an writing transmission mode based on detecting a pressure at or above the second threshold, wherein the writing transmission mode frame rate is higher than a hover transmission mode frame rate; terminating the writing transmission mode based on detecting the pen-up status for a pre-defined period.

Optionally, the method comprises reporting the tip state and reporting the pressure during the writing transmission mode.

Optionally, the method comprises transmitting a time stamp indicating timing of a switch between the pen-up and the pen-down.

Optionally, the method comprises transmitting the pressure during the writing transmission mode and not transmitting the pressure during the hover transmission mode.

Optionally, the method comprises switching to a synchronization transmission mode based on detecting the pen-up status for a second pre-defined period, the second pre-defined period being longer than the first pre-defined period, wherein the beacon signals are transmitted at a higher rate during the synchronization transmission mode as compared to transmission of the beacon signals in the hover transmission mode.

Optionally, the beacon signals transmitted during the synchronization transmission mode includes dummy beacon signals.

Optionally, the method comprises the beacon signals are encoded with information regarding timing of an actual beacon signal.

Optionally, the method comprises the at least one pre-defined first threshold includes one threshold to define a switch between pen-up and pen-down and another threshold to define a switch between pen-down and pen-up.

According to some exemplary embodiments, there is provided method comprising: detecting pen-up and pen-down events of a stylus; detecting timing between a pen-up event and a previous pen-down event; transmitting in a synchronization transmission mode based on detecting a pen-down event and based on the timing being above a defined threshold, wherein the synchronization transmission mode is defined by transmission of both an actual beacon signal and at least one dummy beacon signal per frame, wherein the actual beacon signal is configured to be synchronized with a refresh cycle of a digitizer system and wherein the dummy beacon signal includes or is accompanied by information related to timing of the actual beacon signal.

Optionally, the dummy beacon signal includes or is accompanied by information related to timing of the pen-down event.

Optionally, the defined threshold is in the order of magnitude of seconds.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A device comprising:
   a tip that is sensitive to contact pressure;
   a sensor configured to detect the contact pressure;
   memory configured to store at least one pre-defined first threshold and a pre-defined second threshold on the contact pressure, wherein the first threshold defines tip state as one of a pen-up and a pen-down, wherein pressures below the first threshold defines pen-up and pressures above the first threshold define pen-down and the second threshold is below the first threshold;
   a circuit configured to:
      transmit in a hover transmission mode based on detecting pressures below the second threshold;
      switch to an writing transmission mode based on detecting a pressure at or above the second threshold, wherein the writing transmission mode frame rate is higher than a hover transmission mode frame rate; and
      terminate the writing transmission mode based on detecting the pen-up status for a first pre-defined period.

2. The device of claim 1, wherein the circuit is configured to transmit the tip state and the pressure during the writing transmission mode.

3. The device of claim 1, wherein the circuit is configured to transmit a time stamp indicating a switch between the pen-up and the pen-down.

4. The device of claim 1, wherein the circuit is configured to transmit the pressure during the writing transmission mode and not to transmit pressure during the hover transmission mode.

5. The device of claim 1, wherein the circuit is configured to switch to a synchronization transmission mode based on detecting the pen-up status for a second pre-defined period, the second pre-defined period being longer than the first pre-defined period, wherein the circuit is defined to transmit beacon signals at an accelerated rate during the synchronization transmission mode as compared to rate of transmitting beacon signals in the hover transmission mode.

6. The device of claim 5, wherein the beacon signals transmitted during the synchronization transmission mode includes dummy beacon signals.

7. The device of claim 6, wherein the beacon signals are encoded with information regarding timing of an actual beacon signal.

8. The device of claim 1, wherein the at least one pre-defined first threshold includes one threshold to define a switch between pen-up and pen-down and another threshold to define a switch between pen-down and pen-up.

9. The device of claim 1, wherein the first pre-defined period is in the order of magnitude of 10 msec.

10. A method comprising:
    detecting pressure applied on a tip of a stylus;
    defining at least one first threshold configured to define tip state as one of a pen-up and pen-down, wherein pressures below the first threshold defines pen-up and pressures above the first threshold define pen-down;
    defining a second threshold below the first threshold;
    transmitting in a hover transmission mode based on detecting pressures below the second threshold;
    switching to an writing transmission mode based on detecting a pressure at or above the second threshold, wherein the writing transmission mode frame rate is higher than a hover transmission mode frame rate; and
    terminating the writing transmission mode based on detecting the pen-up status for a pre-defined period.

11. The method of claim 10, comprising reporting the tip state and reporting the pressure during the writing transmission mode.

12. The method of claim 10, comprising transmitting a time stamp indicating timing of a switch between the pen-up and the pen-down.

13. The method of claim 10, comprising transmitting the pressure during the writing transmission mode and not transmitting the pressure during the hover transmission mode.

14. The method of claim 10, comprising:
    switching to a synchronization transmission mode based on detecting the pen-up status for a second pre-defined period, the second pre-defined period being longer than the first pre-defined period,
    transmitting beacon signals at an accelerated rate during the synchronization transmission mode as compared to rate of transmitting beacon signals in the hover transmission mode, wherein the beacon signals are transmitted at a higher rate during the synchronization transmission mode as compared to transmission of the beacon signals in the hover transmission mode.

15. The method of claim 14, wherein the beacon signals transmitted during the synchronization transmission mode includes dummy beacon signals.

16. The method of claim 15, wherein the beacon signals are encoded with information regarding timing of an actual beacon signal.

17. The method of claim 10, wherein the at least one pre-defined first threshold includes one threshold to define a switch between pen-up and pen-down and another threshold to define a switch between pen-down and pen-up.

18. A method comprising:
    detecting pen-up and pen-down events of a stylus;
    detecting timing between a pen-up event and a previous pen-down event;
    transmitting in a synchronization transmission mode based on detecting a pen-down event and based on the timing being above a defined threshold,
    wherein the synchronization transmission mode is defined by transmission of both an actual beacon signal and at least one dummy beacon signal per frame, wherein the actual beacon signal is configured to be synchronized with a refresh cycle of a digitizer system and wherein the dummy beacon signal includes or is accompanied by information related to timing of the actual beacon signal.

19. The method of claim 18, wherein the dummy beacon signal includes or is accompanied by information related to timing of the pen-down event.

20. The method of claim 18, wherein the defined threshold is in the order of magnitude of seconds.

* * * * *